United States Patent Office.

S. J. BEELER, OF WALES, ILLINOIS.

Letters Patent No. 64,473, dated May 7, 1867.

IMPROVED SOAP.

The Schedule referred to in these Letters Patent and making part of the same.

TO ALL WHOM IT MAY CONCERN:

Be it known that I, S. J. BEELER, of Wales, in the county of Ogle, and State of Illinois, have invented certain new and useful Improvements in Soap; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to make and use my invention, I will proceed to describe it.

My invention consists in so composing certain ingredients hereinafter mentioned, as to make a new and improved compound chemical erasive soap.

To make my soap, I take one and a half (1½) pound of stone lime, or its equivalent in chloride of lime; one (1) pound of concentrated lye, or its equivalent in potash or lye made from wood ashes; two (2) pounds of sal soda; one (1) ounce of salts of tartar; six (6) ounces of borax; one (1) ounce of saltpetre; six (6) ounces of alum; five (5) pounds of animal grease, and such quantity of water as may be necessary in and about the manufacturing of the soap; soft water is preferable. I first dissolve the stone lime or chloride of lime by pouring about a half gallon of water over it and stirring until the lime is well dissolved or slaked. Then I dissolve the concentrated lye or potash in one gallon of hot water, and as soon as it is dissolved I add the sal soda and let it dissolve, and then add the salts of tartar. This done, then I pour the liquid so made into the vessel containing the lime or chloride of lime and water, and let the whole stand a few hours to settle. When I use lye from wood ashes, I make it strong enough to bear up an egg, then I make it hot, add the sal soda, salts of tartar, and proceed in the manner before described. When the prepared lye is well settled and clear, then I put the five (5) pounds of animal grease into a kettle and add one quart of the prepared lye, and commence boiling my soap over a slow fire, and boil it for half (½) an hour, and then I add the borax and saltpetre, (or they may be put in with the grease at first.) I now put in a sufficient quantity of water to make the whole have the appearance of rendered honey. I then boil faster, and keep putting the prepared lye into the mixture in small quantities until it is all in. Should any of the prepared lye remain in the vessel in which it was prepared, I pour in some water, shake it round, and then pour it into the mixture, so as to get the whole strength of the lye. As some of the water evaporates during the boiling, I add enough occasionally to supply the deficiency so made. This done, I now add the alum and keep stirring the mixture until the soap is nearly finished. When nearly finished it will become almost transparent, and drop from the stirrer in nice flakes. It may now be variegated with colors and perfumed, or treated in any desirable manner.

Should the grease and lye during the process refuse to unite, or after boiling for two hours, I dip the grease or soap off of the top of the lye into another kettle, boil it till it assumes the appearance of honey, and then proceed again as above described.

My soap can be made stronger or weaker, to suit the purpose for which it is intended, by adding more or less lye. And it can be made into a beautiful soft soap by adding a sufficient quantity of soft water.

Having thus described my invention, what I claim is—

The use of the ingredients herein named, in the proportions substantially as set forth, when treated as described, for the manufacture of a new article of chemical erasive soap.

S. J. BEELER.

Witnesses:
    M. B. GEROULD,
    J. L. WERTZ.